United States Patent
Baumgart et al.

(10) Patent No.: US 7,169,877 B2
(45) Date of Patent: *__Jan. 30, 2007__

(54) THERMALLY HARDENABLE AND WITH ACTINIC RADIATION MULTICOMPONENT COATING MATERIALS, ADHESIVES AND SEALING MATERIALS AND THE USE THEREOF

(75) Inventors: Hubert Baumgart, Münster (DE); Uwe Meisenburg, Duisburg (DE); Heinz-Peter Rink, Münster (DE)

(73) Assignee: BASF Coatings AG, Munster (DE)

( * ) Notice: Subject to any disclaimer, the term of this patent is extended or adjusted under 35 U.S.C. 154(b) by 672 days.

This patent is subject to a terminal disclaimer.

(21) Appl. No.: 10/380,916

(22) PCT Filed: Sep. 26, 2001

(86) PCT No.: PCT/EP01/11107

§ 371 (c)(1),
(2), (4) Date: Mar. 18, 2003

(87) PCT Pub. No.: WO02/26852

PCT Pub. Date: Apr. 4, 2002

(65) Prior Publication Data

US 2004/0087714 A1    May 6, 2004

(30) Foreign Application Priority Data

Sep. 28, 2000   (DE) ................................ 100 47 989

(51) Int. Cl.
| | | |
|---|---|---|
| B05D 7/14 | (2006.01) | |
| B05D 1/36 | (2006.01) | |
| B05D 3/02 | (2006.01) | |
| B05D 3/06 | (2006.01) | |
| C08G 18/00 | (2006.01) | |

(52) U.S. Cl. ............ 528/73; 252/600; 427/207.1; 427/407.1; 427/514; 427/516; 427/520

(58) Field of Classification Search ............ 427/407.1, 427/207.1, 508, 514, 516, 520, 553; 252/600; 525/123, 127, 128, 934; 528/69, 73
See application file for complete search history.

(56) References Cited

U.S. PATENT DOCUMENTS

| | | | |
|---|---|---|---|
| 4,002,601 A | 1/1977 | Hajek et al. | |
| 4,522,913 A | 6/1985 | Kanno et al. | |
| 5,412,056 A | 5/1995 | Zwiener et al. | ............ 528/73 |
| 5,716,678 A | 2/1998 | Rockrath et al. | |
| 5,744,569 A | 4/1998 | Bruchmann et al. | ............ 528/73 |
| 6,261,645 B1 | 7/2001 | Betz et al. | |
| 6,410,646 B1 | 6/2002 | Rockrath et al. | |
| 6,756,072 B2 * | 6/2004 | Baumgart et al. | ............ 427/195 |
| 7,008,673 B2 * | 3/2006 | Baumgart et al. | ....... 427/407.1 |
| 2003/0104132 A1 | 6/2003 | Baumgart et al. | |
| 2003/0166815 A1 | 9/2003 | Baumgart et al. | |

FOREIGN PATENT DOCUMENTS

| | | |
|---|---|---|
| CA | 2310715 | 11/1998 |
| CA | 2258813 | 1/1999 |
| DE | 196 09 617 | 9/1997 |
| DE | 197 57 080 | 6/1999 |
| DE | 19850210 | 5/2000 |
| DE | 19850243 | 5/2000 |
| DE | 10020969 | 11/2001 |
| DE | 10023229 | 11/2001 |
| DE | 10047989 | 4/2002 |
| DE | 10118532 | 10/2002 |
| DE | 10140145 | 3/2003 |
| EP | 594142 | 4/1994 |
| EP | 710707 | 11/1994 |
| EP | 0 915 113 A1 * | 5/1999 |
| EP | 915113 | 5/1999 |
| WO | WO03/037952 | 5/2003 |

OTHER PUBLICATIONS

Patent Abstract Of Japan, vol. 1998, No. 01, Jan. 30, 1998, JP 09 235462, Dainppon Ink & Amp; Chem Inc.
Abstract for DE10020969 from EPO, Nov. 8, 2001.
Abstract for DE10023229 from EPO, Nov. 22, 2001.
Abstract for DE10118532 from EPO, Oct. 24, 2002.
U.S. Appl. No. 09/830,694, filed Apr. 27, 2001, Rink et al.
U.S. Appl. No. 10/483,701, filed Jan. 13, 2004, Baumgart et al.
U.S. Appl. No. 09/830,440, filed May 15, 2001, Baumgart et al.

* cited by examiner

*Primary Examiner*—William Phillip Fletcher, III

(57) ABSTRACT

A process for producing a clearcoat and a multi-component composition. The process comprises applying the multi-component composition to a primed substrate, an unprimed substrate, or a coated substrate. The multi-component composition comprises (A) a binder containing on average at least one isocyanate-reactive functional group, (B) an adduct prepared from (b1) a diisocyanate and (b2) a compound of the general formula I containing an isocyanate-reactive group:

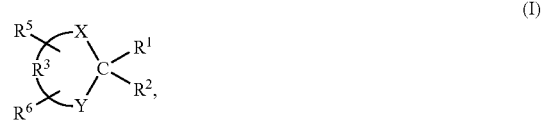

(I)

and (C) at least one cross-linking agent containing on average at least one isocyanate group and at least one functional group which may be activated by actinic reaction.

19 Claims, No Drawings

THERMALLY HARDENABLE AND WITH ACTINIC RADIATION MULTICOMPONENT COATING MATERIALS, ADHESIVES AND SEALING MATERIALS AND THE USE THEREOF

CROSS REFERENCE TO RELATED APPLICATIONS

This application is a National Phase Application of Patent Application PCT/EP01/11107 filed on 26 Sep. 2001, which claims priority to DE 100 47 989.8, filed on 28 Sep. 2000.

The present invention relates to novel multicomponent coating materials, adhesives and sealing compounds curable thermally and with actinic radiation (dual cure). The present invention further relates to the use of the novel dual-cure multicomponent coating materials to produce novel clearcoats or solid-color and effect topcoats, basecoats and multicoat systems in the OEM finishing and refinishing of motor vehicles, in the interior and exterior coating of constructions, in furniture, window and door coating, and in industrial coating, including coil coating, container coating, and the impregnation of electrical components. The present invention additionally relates to the use of the novel dual-cure multicomponent adhesives and sealing compounds to produce novel adhesive films and seals, especially in the abovementioned fields of application.

Coating materials, adhesives and sealing compounds which are curable both thermally and with actinic radiation (dual-cure coating materials, adhesives and sealing compounds) are increasingly gaining interest since they offer numerous advantages.

Here and below, actinic radiation denotes electromagnetic radiation such as near infrared (NIR), visible light, UV radiation, or X-rays, especially UV radiation, or corpuscular radiation such as electron beams.

Firstly, for instance, dual-cure coating materials are more suited to the coating of heat-sensitive substrates than are coating materials which are curable by means of heat alone, since in the dual-cure systems any incomplete thermal curing at low temperatures may be compensated by the curing with actinic radiation, resulting overall in coatings having good performance properties. Secondly, dual-cure coating materials are more suited to the coating of three-dimensional substrates of complex shape than are coating materials curable with actinic radiation only, since incomplete radiation curing in the shadow regions of the substrates may be compensated by the thermal curing, resulting overall, here again, in coatings having good performance properties.

The same applies, mutatis mutandis, to the dual-cure adhesives and sealing compounds.

Thermally curable two-component coating materials comprising—in very general terms—reactive components containing isocyanate-reactive functional groups, customary and known polyisocyanates, and adducts of diisocyanates and dioxolanes, dioxanes or oxazolidines which contain an isocyanate-reactive functional group, in a molar ratio of 1:1, are known from German Patent Application DE 196 09 617 A1. The reactive components comprise hydroxy-functional addition polymers (free-radically polymerized), polycondensates or polyadducts. These known clearcoat materials have a comparatively high solids content of up to 76% by weight. The clearcoats produced from them have good mechanical properties, in particular a comparatively high hardness and flexibility, and also a comparatively high chemical resistance.

However, the thermally curable two-component coating materials known from DE 196 09 617 A1 are not so widely applicable as would in fact be desirable. Moreover, there is a need to extend further their pot life, i.e., the time within which, after the two components have been mixed, the coating materials can be processed without problems and give flawless coatings. Furthermore, their solids content should be increased still further. Not least, they cannot be cured thermally and with actinic radiation (dual cure).

Dual-cure multicomponent coating materials and processes for producing coatings from them are known from European Patent EP-A-0 928 800. The known dual-cure multicomponent coating materials comprise a urethane (meth)acrylate containing (meth)acrylate groups and free isocyanate groups, a UV initiator (photoinitiator) which initiates the free-radical polymerization, and an isocyanate-reactive compound. Suitable isocyanate-reactive compounds include polyols such as polyesters formed from diols and triols and also dicarboxylic acids, hindered amines formed from maleic esters and cycloaliphatic primary diamines, polyether polyols, or hydroxyl-containing (meth)-acrylate copolymers. For application, however, the known dual-cure multicomponent coating materials must be diluted to a comparatively low solids content of, for example, 30% by weight solids (cf. the European patent application, page 5 line 15).

It is an object of the present invention to provide new dual-cure multicomponent coating materials, adhesives and sealing compounds which no longer exhibit the disadvantages of the prior art but which instead have particularly high solids contents and may nevertheless be applied simply and without problems to primed and unprimed substrates, have very good leveling, do not form runs, and produce coatings, adhesive films and seals, but especially clearcoats, which possess excellent scratch resistance, abrasion resistance and chemical resistance.

Accordingly, we have found the novel multicomponent coating materials, adhesives and sealing compounds curable thermally and with actinic radiation (dual cure), comprising (A) at least one binder containing on average at least one isocyanate-reactive functional group in the molecule and (B) at least one adduct preparable from
 (b1) at least one diisocyanate and
 (b2) at least one compound of the general formula I containing an isocyanate-reactive functional group:

in which the variables have the following definition:

$R^1$ and $R^2$ independently of one another are hydrogen atoms or alkyl radicals having 1 to 10 carbon atoms;

X and Y independently of one another are an oxygen atom, a sulfur atom or a radical $>N-R^6$, in which $R^6$ is an aliphatic radical having 1 to 30 carbon atoms and whose carbon chain may be interrupted by one or more oxygen atoms, or are an aromatic group having 6 to 30 carbon atoms;

$R^3$ is an alkylene radical having 1 to 5 carbon atoms;

$R^4$ and $R^5$ independently of one another are hydrogen atoms, isocyanate-reactive functional groups, or radicals $R^6$;

with the proviso that one radical $R^4$, $R^5$ or $R^6$ contains an isocyanate-reactive functional group or one radical $R^4$ or $R^5$ is an isocyanate-reactive functional group, in which case the other radicals $R^4$, $R^5$ or $R^6$—where present—contain no isocyante-reactive functional groups;

the molar ratio of isocyanate groups in the diisocyanates (b1) to the isocyanate-reactive functional groups in the compound I being from 0.8:1.2 to 1.2:0.8;

and (C) at least one crosslinking agent containing on average at least one isocyanate group and at least one functional group having at least one bond which may be activated by actinic radiation in the molecule.

In the text below, the novel dual-cure multicomponent coating materials, adhesives and sealing compounds are referred to as "coating materials, adhesives and sealing compounds of the invention".

We have also found the novel process for producing a clearcoat by applying a clearcoat material to a primed or unprimed substrate or to a coating present thereon, in which the clearcoat material used comprises the coating material of the invention.

We have additionally found the novel process for producing a color and/or effect coating by applying a pigmented solid-color topcoat to a primed or unprimed substrate, in which the solid-color topcoat material used comprises the coating material of the invention.

Not least, we have found the novel process for producing a multicoat color and/or effect coating on a primed or unprimed substrate by (1) applying a basecoat material to the substrate,
(2) drying and/or partially curing or fully curing the basecoat film,
(3) applying a clearcoat material to the dried and/or partially cured basecoat film or the cured basecoat, and
(4) jointly curing the clearcoat film of the basecoat film, or separately curing the clearcoat film, which involves using (a) a basecoat material known per se and the coating material of the invention as clearcoat material,
(b) a clearcoat material known per se and the coating material of the invention as basecoat material, or
(c) a pigmented and an unpigmented coating material of the invention as basecoat material and as clearcoat material.

Not least, we have found the novel process for producing novel adhesive films and/or seals on and in primed and unprimed substrates, which involves applying adhesives and/or sealing compounds of the invention to and/or into the substrates and curing them.

In the text below, the novel processes are referred to comprehensively as "processes of the invention".

Further subject matter of the invention will emerge from the description.

In the light of the prior art it was surprising and unforeseeable for the skilled worker that the object on which the present invention is based could be achieved by the combination of a selected adduct (B) and a dual-cure crosslinking agent (C). A particular surprise was that the coating materials, adhesives and sealing compounds of the invention can have an extraordinarily high solids content without the excellent application properties suffering as a result. A further surprise was the extremely broad applicability of the coating materials, adhesives and sealing compounds of the invention. Yet a further surprise was the good reflow behavior of the coatings of the invention produced from the coating materials of the invention.

The coating materials, adhesives and sealing compounds of the invention are multicomponent systems. This means that their highly reactive constituents are present in a form in which they are distributed over a number of components which are each per se stable on storage, and said constituents are only combined a comparatively short time before application. In the context of the present invention, "comparatively short time" denotes a period of from 1 minute to 24 hours and "stable on storage" means that the component in question may be stored without decomposition and/or premature crosslinking for at least 24 hours, preferably at least one week. The constituents are preferably in a form in which they are distributed over two components, with the binders and, if appropriate, the reactive diluents being present in one component and the crosslinking agents in the other component.

The first component of the coating materials, adhesives and sealing compounds of the invention comprises the binder-containing component or binder component.

The essential constituent of the binder component for use in accordance with the invention is at least one binder (A). The binder (A) contains at least one isocyanate-reactive functional group. Preferably, the binder (A) contains at least two, in particular at least three, isocyanate-reactive functional groups. Examples of suitable isocyanate-reactive functional groups are thiol, hydroxyl and/or primary and/or secondary amino groups, of which hydroxyl groups are advantageous and are used with preference in accordance with the invention.

Furthermore, the binder (A) may also contain one of the functional groups described below having at least one bond which may be activated with actinic radiation.

Examples of suitable binders (A) are random, alternating and/or block, linear and/or branched and/or comb (co)polymers of ethylenically unsaturated monomers, or polyaddition resins and/or poly-condensation resins. Regarding these terms, reference is made to Römpp Lexikon Lacke und Druckfarben, Georg Thieme Verlag, Stuttgart, New York, 1998, pages 73 and 74, "Binders", page 457, "Polyaddition" and "Polyaddition resins (polyadducts)", and also pages 463 and 464, "Polycondensates", "Polycondensation" and "Polycondensation resins".

Examples of highly suitable polymers are linear and/or branched and/or block, comb and/or random poly-(meth)acrylates or acrylate copolymers, polyesters, alkyds, polyurethanes, acrylated polyurethanes, acrylated polyesters, polylactones, polycarbonates, polyethers, epoxy resin-amine adducts, (meth)acrylate diols, partially hydrolyzed polyvinyl esters or polyureas, but especially (meth)acrylate copolymers (A).

Advantageous (meth)acrylate copolymers (A) have an OH number of from 10 to 200 mg KOH/g,
an acid number of from 3 to 100 mg KOH/g,
a glass transition temperature of from −35 to +60° C.,
a number-average molecular weight of from 1000 to 20,000 daltons, and
a mass-average molecular weight of from 2000 to 100,000 daltons.

In each case based on (A), the (meth)acrylate copolymers of (A) contain up to 80, preferably up to 70, more preferably up to 60, with particular preference up to 55, with very particular preference up to 50, and in particular up to 45% by weight of hydroxyl-containing olefinically unsaturated monomers (a1) in copolymerized form.

Examples of suitable hydroxyl-containing olefinically unsaturated monomers (a1) are 2-alkylpropane-1,3-diol mono(meth)acrylates such as 2-methyl-, 2-ethyl-, 2-propyl-, 2-isopropyl- or 2-n-butylpropane-1,3-diol mono(meth)acrylate.

Further examples of suitable other hydroxyl-containing, olefinically unsaturated monomers (a1) are hydroxyalkyl esters of acrylic acid, methacrylic acid or another alpha,beta-ethylenically unsaturated carboxylic acid which are (i) derived from an alkylene glycol which is esterified with the acid, or (ii) obtainable by reacting the acid with an alkylene oxide such as ethylene oxide or propylene oxide; especially hydroxyalkyl esters of acrylic acid, methacrylic acid, crotonic acid or ethacrylic acid in which the hydroxyalkyl group contains up to 20 carbon atoms, such as 2-hydroxyethyl, 3-hydroxypropyl, 3-hydroxybutyl or 4-hydroxybutyl acrylate methacrylate, ethacrylate or crotonate; 1,4-bis(hydroxymethyl)cyclohexane or octahydro-4,7-methano-1H-indenedimethanol monoacrylate, monomethacrylate, monoethacrylate or monocrotonate; or reaction products of cyclic esters, such as epsilon-caprolactone, for example, and these hydroxyalkyl esters; or olefinically unsaturated alcohols such as allyl alcohol; or polyols such as trimethylolpropane monoallyl or diallyl ether or pentaerythritol monoallyl, diallyl or triallyl ether. These higher-functional monomers (a1) are used generally only in minor amounts. In the context of the present invention, minor amounts of higher-functional monomers (a1) are amounts which do not lead to crosslinking or gelling of the (meth)acrylate copolymers (A) unless the intention is that the copolymers should be present in the form of crosslinked microgel particles.

Also suitable as monomers (a1) are ethoxylated and/or propoxylated allyl alcohol, which is sold by Arco Chemicals, or 2-hydroxyalkyl allyl ethers, especially 2-hydroxyethyl allyl ether. If used, they are used preferably not as sole monomers (a1) but in an amount of from 0.1 to 10% by weight, based on the (meth)acrylate copolymer (A).

Also suitable are reaction products of acrylic acid and/or methacrylic acid with the glycidyl ester of an alpha-branched monocarboxylic acid having 5 to 18 carbon atoms per molecule, especially a Versatic® acid, or, instead of the reaction products, an equivalent amount of acrylic and/or methacrylic acid which is then reacted, during or after the polymerization reaction, with the glycidyl ester of an alpha-branched monocarboxylic acid having 5 to 18 carbon atoms per molecule, in particular a Versatic® acid (cf. Römpp Lexikon Lacke und Druckfarben, Georg Thieme Verlag, Stuttgart, New York, 1998, "Versatic® acids", pages 605 and 606).

Furthermore, the (meth)acrylate copolymers (A) comprise further olefinically unsaturated monomers (a2), whose proportion in (A) is at least 10, preferably at least 12, more preferably at least 14, with particular preference at least 16, with very particular preference at least 18, and in particular at least 20% by weight.

Examples of suitable monomers (a2) are

Monomers (a21):

(Meth)acrylic esters which are essentially free from acid groups, such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indene-methanol or tert-butylcyclohexyl (meth)acrylate; (meth)acrylic oxaalkyl or oxacycloalkyl esters such as ethoxytriglycol (meth)acrylate and methoxyoligoglycol (meth)acrylate having a molecular weight Mn of preferably 550 daltons or other ethoxylated and/or propoxylated, hydroxyl-free (meth)acrylic acid derivatives (further examples of suitable monomers (a2) of this kind are known from the laid-open specification DE 196 25 773 A1, column 3, line 65 to column 4, line 20). In minor amounts they may contain higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1 1H-indenedimethanol or cyclohexane-1,2-, -1,3- or -1,4-diol di(meth)acrylate; trimethylolpropane di- or -tri(meth)acrylate; or pentaerythritol di-, tri- or tetra(meth)acrylate. As far as the amounts of higher-functional monomers (a21) are concerned, the comments made above with respect to the monomers (a2) apply.

Monomers (a22):

Ethylenically unsaturated monomers carrying at least one acid group, preferably a carboxyl group, per molecule, or a mixture of such monomers. As component (a22) it is particularly preferred to use acrylic acid and/or methacrylic acid. However, it is also possible to use other ethylenically unsaturated carboxylic acids having up to 6 carbon atoms in the molecule. Examples of such acids are ethacrylic acid, crotonic acid, maleic acid, fumaric acid and itaconic acid. It is also possible to use ethylenically unsaturated sulfonic or phosphonic acids, or their partial esters, as component (a22). Further suitable monomers (a22) are maleic acid mono (meth)acryloyloxyethyl ester, succinic acid mono-(meth)acryloyloxyethyl ester and phthalic acid mono-(meth)acryloyloxyethyl ester, and also vinylbenzoic acid (all isomers), alpha-methylvinylbenzoic acid (all isomers) or vinylbenzenesulfonic acid (all isomers). Further examples of acid-group-containing monomers (a22) are known from the laid-open specification DE 196 25 773 A1, column 2, line 58 to column 3 line 8, or from International Patent Application WO 98/49205, page 3 lines 23 to 34.

Monomers (a23):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids having 9 to 11 carbon atoms which are branched on the alpha carbon atom.

Monomers (a24):

N,N-Diethylamino-alpha-methylstyrene (all isomers), N,N-diethylaminostyrene (all isomers), allylamine, crotylamine, 2-amino- or 2-N-methyl-, 2-N,N-dimethyl-, 2-N-ethyl-, 2-N,N-diethyl-, 2-N-propyl-, 2-N,N-dipropyl-, 2-N-butyl-, 2-N-N-dibutyl-, 2-N-cyclohexyl or 2-N,N-cyclohexylmethylamino or 2-N,N,N-tetramethylammonium- or 2-N,N-dimethyl-N,N-diethylammonium-, 2-tetramethylphosphonium- or 2-triethylsulfoniumethyl acrylate, -ethyl methacrylate, -propyl acrylate or -propyl methacrylate, or 3-amino- or 3-N-methyl-, 3-N,N-dimethyl-, 3-N-ethyl-, 3-N,N-diethyl-, 3-N-propyl-, 3-N,N-dipropyl-, 3-N-butyl-, 3-N,N-dibutyl-, 3-N-cyclohexyl- or 3-N,N-cyclohexyl-methylamino- or 3-N,N,N,N-tetramethylammonium- or 3-N,N-dimethyl-N,N-diethylammonium-, 3-tetramethyl-phosphonium- or 3-triethylsulfoniumpropyl acrylate or -propyl methacrylate.

Monomers (a25)

Diarylethylenes, especially those of the general formula V:

$$R^7R^8C=CR^9R^{10} \qquad (V),$$

in which the radicals $R^7$, $R^8$, $R^9$ and $R^{10}$ in each case independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diylcyclohexane. Examples of suitable cyclo-alkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl and especially phenyl. Examples of suitable alkylaryl radicals are benzyl or ethylene- or propane-1,3-diylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^7$, $R^8$, $R^9$ and/or $R^{10}$ are preferably phenyl or naphthyl radicals, especially phenyl radicals. The substituents that may be present in the radicals $R^7$, $R^8$, $R^9$ and/or $R^{10}$ are electron-withdrawing or electron-donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals and/or primary, secondary and/or tertiary amino groups. Diphenylethylene, dinaphthaleneethylene, cis- or trans-stilbene, vinylidene-bis(4-N,N-dimethylaminobenzene), vinylidene-bis(4-aminobenzene) or vinylidene-bis(4-nitrobenzene) especially diphenylethylene (DPE), are particularly advantageous and so are used with preference. In the context of the present invention, the monomers (a25) are used in order to regulate the copolymerization advantageously such that batchwise free-radical copolymerization is also possible.

Monomers (a26):

Cyclic and/or acyclic olefins such as ethylene, propylene, but-1-ene, pent-1-ene, hex-1-ene, cyclo-hexene, cyclopentene, norbornene, butadiene, isoprene, cyclopentadiene and/or dicyclopentadiene.

Monomers (a27):

Amido-containing monomers such as (meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclo-hexylmethyl- and/or N-methylol-, N,N-dimethylol-, N-methoxymethyl-, N,N-di(methoxymethyl)-, N-ethoxy-methyl- and/or N,N-di(ethoxyethyl)-(meth)acrylamide; monomers containing carbamate groups, such as (meth)acryloyloxyethyl carbamate or (meth)acryloyl-oxypropyl carbamate; or monomers containing urea groups, such as ureidoacrylate or ureidomethacrylate;

Monomers (a28):

Monomers containing epoxide groups, such as the glycidyl ester of acrylic acid, methacrylic acid, ethacrylic acid, crotonic acid, maleic acid, fumaric acid and/or itaconic acid.

Monomers (a29)

Vinylaromatic hydrocarbons such as styrene, vinyltoluene, diphenylethylene or alpha-alkylstyrenes, especially alpha-methylstyrene;

Monomers (a210):

Nitriles such as acrylonitrile and/or meth-acrylonitrile;

Monomers (a211):

Vinyl compounds, especially vinyl halides and/or vinylidene dihalides, such as vinyl chloride, vinyl fluoride, vinylidene dichloride or vinylidene difluoride; N-vinyl amides such as vinyl-N-methylformamide, N-vinylcaprolactam or N-vinyl pyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (a212):

Allyl compounds, especially allyl ethers and allyl esters such as allyl methyl, ethyl, propyl or butyl ether or allyl acetate, propionate or butyrate.

Monomers (a213):

Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000, and in particular from 3000 to 7000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat No. 4,754,014 A1 in columns 5 to 9, in DE 44 21 823 A1 or in International Patent Application WO 92/22615 on page 12 line 18 to page 18 line 10.

Monomers (a214):

Acryloxysilane-containing vinyl monomers, preparable by reacting hydroxy-functional silanes with epichloro-hydrin and subsequently reacting the reaction product with (meth)acrylic acid and/or hydroxyalkyl esters and/or hydroxycycloalkyl esters of (meth)acrylic acid and/or further hydroxyl-containing monomers (a2).

The monomers (a1) and (a2) are preferably selected so as to give the abovementioned OH numbers and glass transition temperatures. Moreover, the nature and amount of the monomers (a2), which contain reactive functional groups, are selected so as not to inhibit or prevent completely the crosslinking reactions of the hydroxyl groups with the below-described adducts (B) and/or crosslinking agents (C) in the other component.

The selection of the monomers (a) for adjusting the glass transition temperatures can be undertaken by the skilled worker with the aid of the following formula of Fox, by means of which the glass transition temperatures of (meth) acrylate copolymers (A) can be calculated approximately:

$$1/Tg = \sum_{n=1}^{n=x} W_n/Tg_n; \quad \Sigma_n W_n = 1$$

where

Tg=glass transition temperature of the poly(meth)acrylate;
$W_n$=weight fraction of the nth monomer;
$Tg_n$=glass transition temperature of the homopolymer of the nth monomer; and
x=number of different monomers.

The preparation of the (meth)acrylate copolymers (A) for use in accordance with the invention has no special features as to method but takes place with the aid of the methods of continuous or batchwise free-radically initiated copolymerization, which are known and customary in the field of plastics, in bulk, solution, emulsion, miniemulsion or microemulsion under atmospheric pressure or superatmospheric pressure in stirred vessels, autoclaves, tubular reactors, loop reactors or Taylor reactors at temperatures from 50 to 200° C.

Examples of suitable copolymerization methods are described in patent applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387, and WO 98/02466.

Examples of suitable free-radical initiators are dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azodinitriles such as azobisiso-butyronitrile; C-C-cleaving initiators such as benzopinacol silyl ether; or a combination of a nonoxidizing initiator with hydrogen peroxide. It is also possible to use combinations of the above-described initiators.

Further examples of suitable initiators are described in German Patent Application DE 196 28 142 A1, page 3 line 49 to page 4 line 6.

It is preferred to add comparatively large amounts of free-radical initiator, with the proportion of the initiator in the reaction mixture, based in each case on the total amount of the monomers (a) and of the initiator, being with particular preference from 0.2 to 20% by weight, with very particular preference from 0.5 to 15% by weight, and in particular from 1.0 to 12% by weight.

Furthermore, thiocarbonylthio compounds or mercaptans such as dodecyl mercaptan may be used as chain transfer agents or molecular weight regulators.

The amount of the above-described (meth)acrylate copolymers (A) in the coating materials, adhesives and sealing compounds of the invention may vary widely. The amount is dependent in particular on the functionality of the binders on the one hand and on the functionality of the below-described adducts (B) and of the crosslinking agents (C) on the other. Preferably, the amount is from 5.0 to 80, more preferably from 6.0 to 75, with particular preference from 7.0 to 70, with very particular preference from 8.0 to 65, and in particular from 9.0 to 60% by weight, based in each case on the solids content of the coating materials, adhesives and sealing compounds of the invention.

The further essential constituent of the binder component is at least one adduct (B). Alternatively, the adduct (B) may be stored separately from the binder component in the form of a separate adduct component, and not admixed to the other components until shortly before application. In accordance with the invention it is of advantage if the separate adduct component is admixed to the binder component.

The adduct (B) can be prepared from a diisocyanate (b1) and a compound I (b2).

Examples of suitable diisocyanates are isophorone diisocyanate (i.e., 5-isocyanato-1-isocyanatomethyl-1,3,3-trimethylcyclohexane), 5-isocyanato-1-(2-iso-cyanatoeth-1-yl)-1,3,3-trimethylcyclohexane, 5-iso-cyanato-1-(3-isocyanatoprop-1-yl)-1,3,3-trimethylcyclo-hexane, 5-iso-cyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl) cyclohexane, 1-isocyanato-2-(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclo-hexane, 1,3-diisocyanatocyclohexane, 1,4-diisocyanato-cyclohexane, dicyclohexylmethane 2,4'-diisocyanate, trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or diisocyanates derived from dimeric fatty acids, as sold under the commercial designation DDI 1410 by Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-iso-cyanatoeth-1-yl)cyclohexane, 1,3-bis(3-isocyanatoprop-1-yl) cyclohexane, 1,2-, 1,4- or 1,3-bis(4-iso-cyanatobut-1-yl) cyclohexane or liquid bis(4-iso-cyanatocyclohexyl)methane with a trans/trans content of up to 30% by weight, preferably 25% by weight and in particular 20% by weight, as described by patent applications DE 44 14 032 A1, GB 1220717 A1, DE 16 18 795 A1 or DE 17 93 785 A1, preferably isophorone diisocyanate, 5-isocyanato-1-(2-iso-cyanato-eth-1-yl)-1,3,3-trimethylcyclohexane, 5-isocyanato-1-(3-isocyanatoprop-1-yl)-1,3,3-trimethyl-cyclohexane, 5-isocyanato-(4-isocyanatobut-1-yl)-1,3,3-trimethyl-cyclohexane, 1-isocyanato-2-(3-isocyanatoprop-1-yl)-cyclohexane, 1-isocyanato-2-(3-isocyanatoeth-1-yl)-cyclohexane, 1-isocyanato-2-(4-isocyanatobut-1-yl)-cyclohexane or HDI, especially HDI.

The compounds I have an isocyanate-reactive functional group. Examples of suitable isocyanate-reactive functional groups are hydroxyl groups, thiol groups and primary or secondary amino groups.

The compounds I have the general formula I:

(I)

in which general formula I $R^1$ and $R^2$ independently of one another are hydrogen atoms or alkyl radicals having 1 to 10 carbon atoms, preferably methyl, ethyl, propyl, isopropyl, n-butyl, sec-butyl, tert-butyl, n-pentyl, isoamyl, n-hexyl, n-heptyl, n-octyl, 2-ethylhex-1-yl, n-nonyl or n-decyl, especially isopropyl;

X and Y independently of one another are oxygen atoms, sulfur atoms or radicals >N—$R^6$, in which $R^6$ is an aliphatic radical having 1 to 30 carbon atoms whose carbon chain may be interrupted by one or more oxygen atoms, such as the above-described radicals $R^1$ and $R^2$, undecyl, dodecyl, tridecyl, tetradecyl, pentadecyl, hexadecyl, heptadecyl, octadecyl, nonadecyl or eicosanyl or oligo(ethylene glycol)-1-yl, oligo-(propylene glycol)-1-yl or oligo(butylene glycol)-1-yl or the corresponding mixed oligomers having a degree of oligomerization of up to 15. Furthermore, $R^6$ may be an aromatic radical having 6 to 30 carbon atoms, such as phenyl, naphthyl or biphenyl-1-yl.

$R^3$ is an alkylene radical having 1 to 5 carbon atoms, such as methylene, eth-1-2-ylene, trimethylene, tetramethylene or pentamethylene.

$R^4$ and $R^5$ independently of one another are hydrogen atoms, isocyanate-reactive functional groups, or radicals $R^6$.

It is essential for the compounds I that one radical $R^4$, $R^5$ or $R^6$ contains an isocyanate-reactive functional group or one radical $R^4$ or $R^5$ is an isocyanate-reactive functional group, the other radicals $R^4$, $R^5$ or $R^6$—if present—containing no isocyanate-reactive functional groups.

Examples of highly suitable compounds I are dioxolanes of the general formula II:

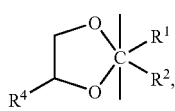
(II)

dioxanes of the general formula III:

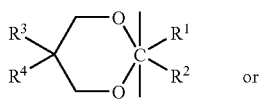
(III)

or oxazolidines of the general formula IV:

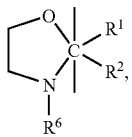
(IV)

in which the radicals $R^1$, $R^2$, $R^4$, $R^5$ and $R^6$ are as defined above, the radicals $R^4$ or $R^6$ containing an isocyanate-reactive functional group.

Examples of suitable dioxolanes (II), dioxanes (III) and dioxazolidines (IV) and their preparation are described in detail in the examples of German Patent Application DE 196 09 617 A1, page 5 line 54 to page 9 line 27.

Of these, the oxazolidines (IV) have particular advantages, and so are used with particular preference in accordance with the invention. Examples of especially suitable oxazolidines (IV) are N-(2-hydroxy-ethyl)-1,3-oxazolidine or N-(2-hydroxyethyl)-2-iso-propyl-1,3-oxazolidine, as described on page 6, Table 1, No. 5a and No. 5b of German Patent Application DE 196 09 617 A1.

For the preparation of the adduct (B) it is essential that the molar ratio of isocyanate groups in the diisocyanates (b1) to the isocyanate-reactive functional groups in the compound I (b2) is from 0.8:1.2 to 1.2:0.8, preferably from 0.9:1.1 to 1.1:0.9, and in particular 1:1.

The amount of the above-described adducts (B) in the coating materials, adhesives and sealing compounds of the invention may vary very widely. It depends in particular on the functionality of the crosslinking agents (C) and of the (meth)acrylate copolymers (A) and on the intended viscosity of the coating materials, adhesives and sealing compounds of the invention. The amount is preferably from 20 to 90, more preferably from 22 to 85, with particular preference from 23 to 80, with very particular preference from 24 to 75, and in particular from 25 to 70% by weight, based in each case on the solids content of the coating materials, adhesives and sealing compounds of the invention, it being possible to choose the amount of (B) to be up to 18 times as high as the amount of (A).

The binder and/or adduct components may comprise customary and known additives (D) in effective amounts. The essential factor is that the additives (D) do not inhibit or completely prevent the crosslinking reactions.

Examples of suitable additives (D) are color and/or effect pigments, organic and inorganic, transparent or opaque fillers, nanoparticles, reactive diluents curable thermally and/or with actinic radiation, low-boiling organic solvents and high-boiling organic solvents ("long solvents"), water, UV absorbers, light stabilizers, free-radical scavengers, thermally labile free-radical initiators, photoinitiators and photocoinitiators, other, additional binders, crosslinking agents as used in one-component systems, thermal crosslinking catalysts, devolatilizers, slip additives, polymerization inhibitors, defoamers, emulsifiers, wetting agents, dispersants, adhesion promoters, flow control agents, film-forming auxiliaries, sag control agents (SCAs), rheology control additives (thickeners), flame retardants, siccatives, dryers, antiskinning agents, corrosion inhibitors, waxes, flatting agents, precursors of organically modified ceramic materials, or additional binders.

The nature and amount of the additives (D) depend on the intended use of the coatings produced with the aid of the coating materials of the invention.

If, for example, a coating material of the invention is used to produce solid-color topcoats or basecoats, it normally comprises color and/or effect pigments (D) and also, if desired, opaque fillers. If a coating material of the invention is used, for example, to produce clearcoats or sealers—which is the preferred end use—these additives (D) are of course not present in the coating material in question.

Examples of suitable effect pigments (D) are metal flake pigments such as commercial aluminum bronzes, aluminum bronzes chromated in accordance with DE 36 36 183 A1, and commercial stainless steel bronzes and also nonmetallic effect pigments, such as pearlescent and interference pigments, for example. For further details, reference is made to Römpp Lexikon Lacke und Druckfarben, Georg Thieme Verlag, 1998, page 176, "Effect pigments" and pages 380 and 381, "Metal oxide-mica pigments" to "Metal pigments".

Examples of suitable inorganic color pigments (D) are titanium dioxide, iron oxides, Sicotrans yellow, and carbon black. Examples of suitable organic color pigments (D) are thioindigo pigments, indanthrene blue, Cromophthal red, Irgazine orange and Heliogen green.

For further details, reference is made to Römpp Lexikon Lacke und Druckfarben, Georg Thieme Verlag, 1998, pages 180 and 181, "Iron blue pigments" to "Black iron oxide", pages 451 to 453 "Pigments" to "Pigment volume concentration", page 563, "Thioindigo pigments", and page 567, "Titanium dioxide pigments".

Examples of suitable organic and inorganic fillers (D) are chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers or wood flour. For further details, reference is made to Römpp Lexikon Lacke und Druckfarben, Georg Thieme Verlag, 1998, pages 250 ff., "Fillers".

Examples of suitable thermally curable reactive diluents (D) are positionally isomeric diethyl-octanediols or hydroxyl-containing hyperbranched compounds or dendrimers, as are described for example in German Patent Applications DE 198 05 421 A1, DE 198 09 643 A1, and DE 198 40 405 A1.

Examples of suitable reactive diluents (D) curable with actinic radiation are those described in Römpp Lexikon Lacke und Druckfarben, Georg Thieme Verlag, Stuttgart, New York, 1998, on page 491 in the entry on "Reactive diluents".

Examples of suitable low-boiling organic solvents (D) and high-boiling organic solvents (D) ("long solvents") are ketones such as methyl ethyl ketone or methyl isobutyl ketone, esters such as ethyl acetate or butyl acetate, ethers such as dibutyl ether or ethylene glycol, diethylene glycol, propylene glycol, dipropylene glycol, butylene glycol or dibutylene glycol dimethyl, diethyl or dibutyl ether, N-methylpyrrolidone or xylenes, or mixtures of aromatic hydrocarbons such as Solventnaphtha® or Solvesso®.

Examples of suitable thermally labile free-radical initiators (D) are organic peroxides, organic azo compounds, or C-C-cleaving initiators such as dialkyl peroxides, peroxocarboxylic acids, peroxodicarbonates, peroxide esters, hydroperoxides, ketone peroxides, azodinitriles or benzpinacol silyl ethers.

Examples of suitable crosslinking catalysts (D) are dibutyltin dilaurate, dibutyltin dioleate, lithium decanoate, zinc octoate or bismuth salts such as bismuth lactate or dimethylolpropionate.

Examples of suitable photoinitiators and coinitiators (D) are described in Römpp Lexikon Lacke und Druckfarben, Georg Thieme Verlag, Stuttgart, 1998, pages 444 to 446.

Examples of suitable additional crosslinking agents (D) as used in one-component systems are amino resins, as described, for example, in Römpp Lexikon Lacke und Druckfarben, Georg Thieme Verlag, 1998, page 29, "Amino resins", in the text book "Lackadditive" [Coatings additives] by Johan Bieleman, Wiley-VCH, Weinheim, New York, 1998, pages 242 ff., in the book "Paints, Coatings and Solvents", second, completely revised edition, Eds. D. Stoye and W. Freitag, Wiley-VCH, Weinheim, New York, 1998, pages 80 ff., in the patents U.S. Pat. No. 4,710,542 A1 or EP-B-0 245 700 A1, and in the article by B. Singh and coworkers, "Carbamylmethylated Melamines, Novel Crosslinkers for the Coatings Industry", in Advanced Organic Coatings Science and Technology Series, 1991, Volume 13, pages 193 to 207; carboxyl-containing compounds or resins, as described for example in the patent DE 196 52 813 A1, compounds or resins containing epoxide groups, as described for example in the patents EP 0 299 420 A1, DE 22 14 650 B1, DE 27 49 576 B1, U.S. Pat. No. 4,091,048 A1 or U.S. Pat. No. 3,781,379 A1, blocked polyisocyanates, as described for example in the patents U.S. Pat. No. 4,444,954 A1, DE 196 17 086 A1, DE 196 31 269 A1, EP 0 004 571 A1 or EP 0 582 051 A1, and/or tris(alkoxycarbonylamino)-triazines, as described in the patents U.S. Pat. Nos. 4,939,213 A1, 5,084,541 A1, 5,288,865 A1 or EP 0 604 922 A1.

Examples of suitable devolatilizers (D) are diazadi-cycloundecane or benzoin.

Examples of suitable emulsifiers (D) are nonionic emulsifiers, such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols.

Examples of suitable wetting agents (D) are siloxanes, compounds containing fluorine, carboxylic monoesters, phosphoric esters, polyacrylic acids and copolymers thereof, or polyurethanes.

An example of a suitable adhesion promoter (D) is tricyclodecanedimethanol.

Examples of suitable film-forming auxiliaries (D) are cellulose derivatives such as cellulose acetobutyrate (CAB).

Examples of suitable transparent fillers (D) are those based on silicon dioxide, aluminum oxide or zirconium oxide; for further details, reference is made to Römpp Lexikon Lacke und Druckfarben, Georg Thieme Verlag, Stuttgart, 1998, pages 250 to 252.

Examples of suitable sag control agents (D) are ureas, modified ureas and/or silicas, as are described, for example, in the references EP 0 192 304 A1, DE 23 59 923 A1, DE 18 05 693 A1, WO 94/22968, DE 27 51 761 C1, WO 97/12945 or "farbe+lack", 11/1992, pages 829 ff.

Examples of suitable rheology control additives (D) are those known from the patents WO 94/22968, EP 0 276 501 A1, EP 0 249 201 A1 or WO 97/12945; crosslinked polymeric microparticles, as disclosed for example in EP 0 008 127 A1; inorganic phyllosilicates such as aluminum-magnesium silicates, sodium-magnesium phyllosilicates and sodium-magnesium-fluorine-lithium phyllosilicates of the montmorillonite type; silicas such as Aerosils, or synthetic polymers having ionic and/or associative groups, such as polyvinyl alcohol, poly(meth)acrylamide, poly(meth)acrylic acid, poly-vinylpyrrolidone, styrene-maleic anhydride or ethylene-maleic anhydride copolymers and their derivatives, or hydrophobically modified ethoxylated urethanes or polyacrylates.

An example of a suitable flatting agent (D) is magnesium stearate.

Examples of suitable precursors (C) for organically modified ceramic materials are hydrolyzable organometallic compounds, especially of silicon and aluminum.

Further examples of the additives (C) recited above, and examples of suitable UV absorbers, free-radical scavengers, flow control agents, flame retardants, siccatives, dryers, antiskinning agents, corrosion inhibitors and waxes (B), are described in detail in the textbook "Lackadditive" [Coatings additives] by Johan Bieleman, Wiley-VCH, Weinheim, New York, 1998.

The preparation of the binder component and/or adduct component for use in accordance with the invention has no special features, but instead takes place in a customary and known manner by mixing of the above-described constituents in suitable mixing equipment such as stirred vessels, dissolvers, stirred mills, or extruders.

The further essential constituent of coating materials, adhesives and sealing compounds of the invention is at least one crosslinking agent (C).

The crosslinking agent (C) is present in the crosslinking component or constitutes its principal constituent.

Accordingly, the crosslinking component may also comprise at least one of the above-described additives (D), provided these do not undergo unwanted reactions with the crosslinking agents (C), such as decomposition reactions or premature crosslinking reactions, for instance.

To prepare the coating materials, adhesives and sealing compounds of the invention, the crosslinking component is mixed with the binder component and/or with the adduct component and, if appropriate, with any further components shortly before the application of the relevant coating materials, adhesives and sealing compounds of the invention.

The crosslinking agent (C) contains on average at least one isocyanate group and at least one functional group having at least one bond which may be activated with actinic radiation in the molecule. Preferably, the crosslinking agent (C) contains at least two isocyanate groups and at least two of said functional groups.

Examples of suitable bonds which may be activated with actinic radiation are carbon-hydrogen single bonds or carbon-carbon, carbon-oxygen, carbon-nitrogen, carbon-phosphorus or carbon-silicon single or double bonds. Of these, the double bonds, especially the carbon-carbon double bonds, are employed with preference.

Highly suitable carbon-carbon double bonds are present, for example, in (meth)acrylate, ethacrylate, crotonate, cinnamate, vinyl ether, vinyl ester, ethenylarylene, dicyclopentadienyl, norbornenyl, isoprenyl, iso-propenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclopentadienyl ester, norbornenyl ester, isoprenyl ester, isopropenyl ester, allyl ester or butenyl ester groups. Of these, (meth)acrylate groups, especially acrylate groups, are of particular advantage and are therefore used with very particular preference in accordance with the invention.

The crosslinking agent (C) may be prepared in any desired manner.

In accordance with the invention, however, crosslinking agents (C) of particular advantage are those prepared from at least one polyisocyanate having an isocyanate functionality of at least 2.0. Preferably, the polyisocyanate has an isocyanate functionality of from 2.0 to 10.0, more preferably from 2.0 to 9.0, with particular preference from 2.0 to 8.0, and in particular from 2.0 to 7.0. With a view to better weathering stability and yellowing resistance, aliphatic and cycloaliphatic polyisocyanates are used with preference. In the context of the present invention, the term "cycloaliphatic diisocyanate" denotes a diisocyanate in which at least one isocyanate group is attached to a cycloaliphatic radical.

Examples of suitable aliphatic and cycloaliphatic polyisocyanates having an isocyanate functionality of 2.0 are the diisocyanates described above in connection with the adducts (B).

Of these, hexamethylene diisocyanate is of particular advantage and is therefore used with very particular preference in accordance with the invention.

Examples of suitable polyisocyanates having an isocyanate functionality >2 are polyisocyanates, especially those based on hexamethylene diisocyanate which contain isocyanurate, biuret, allophanate, iminooxadiazinedione, urethane, urea, carbodiimide and/or uretdione groups and are obtainable in a customary and known manner from the above-described diisocyanates. Of these polyisocyanates, those containing allophanate groups are of advantage and are therefore used with particular preference in accordance with the invention. Examples of suitable preparation processes and polyisocyanates are known from patents CA 2,163,591 A, U.S. Pat. Nos. 4,419,513 A, 4,454,317 A, EP 0 646 608 A1, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. Nos. 5,258,482 A, 5,290,902 A, EP 0 649 806 A1, DE 42 29 183 A1, and EP 0 531 820 A1.

The above-described polyisocyanates are reacted with at least one compound which contains at least one, especially one, isocyanate-reactive functional group and at least one, especially one, bond which may be activated with actinic radiation.

Examples of suitable isocyanate-reactive functional groups are those described above.

Examples of suitable bonds which may be activated with actinic radiation are those described above.

Examples of suitable compounds containing at least one, especially one, isocyanate-reactive functional group and at least one, especially one, bond which may be activated with actinic radiation per molecule are allyl alcohol or 4-butyl vinyl ether;

hydroxyalkyl esters and hydroxycycloalkyl esters of acrylic acid or of methacrylic acid, especially of acrylic acid, which are obtainable by esterifying aliphatic diols, for example, the above-described low molecular mass diols B), with acrylic acid or methacrylic acid or by reacting acrylic acid or methacrylic acid with an alkylene oxide, especially hydroxyalkyl esters of acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl and bis(hydroxy-methyl)cyclohexane acrylate or methacrylate; of these, 2-hydroxyethyl acrylate and 4-hydroxybutyl acrylate are particularly advantageous and are therefore used with particular preference in accordance with the invention; or reaction products of cyclic esters, such as epsilon-caprolactone, for example, and these hydroxyalkyl or hydroxycycloalkyl esters.

The preparation of the crosslinking agents (C) has no special features in terms of its method but instead takes place, for example, as described in European Patent Application EP 0 928 800 A1.

The amount of the above-described crosslinking agents (C) in the coating materials, adhesives and sealing compounds of the invention may vary widely. In particular, it depends on the functionality of the crosslinking agents (C) and of the binders (A) and on the amount of adduct (B). The amount is preferably from 1 to 40, more preferably from 2 to 38, with particular preference from 3 to 36, with very particular preference from 4 to 34, and in particular from 5 to 32% by weight, based in each case on the solids of the coating materials, adhesives and sealing compounds of the invention.

The preparation of the coating materials, adhesives and sealing compounds of the invention from the components described above has no special features in terms of its method but instead is carried out with the aid of the customary and known, above-described mixing apparatuses and methods, or by means of customary two-component or multicomponent metering and mixing units. Ideally, thorough mixing is carried out by hand.

The coating materials, adhesives and sealing compounds of the invention are used to produce coatings, adhesive films and seals on and/or in primed and unprimed substrates. In particular, the coating materials of the invention are used to produce solid-color topcoats, clearcoats, and also basecoats and clearcoats in multicoat color and/or effect coating systems.

In methodological terms, the application of the coating materials of the invention has no special features but instead can be carried out by means of any customary application method, such as spraying, knifecoating, brushing, flowcoating, dipping, trickling or rolling, for example. It is preferred to employ spray application methods, such as, for example, compressed air spraying, airless spraying, high-speed rotation, electrostatic spray application (ESTA), alone or in conjunction with hot spray application such as hot air spraying, for example.

Suitable substrates are surfaces which are undamaged by curing of the coating materials, adhesives and/or sealing compounds present thereon using heat and, if appropriate, actinic radiation; examples include metals, plastics, wood, ceramic, stone, textile, fiber assemblies, leather, glass, glass fibers, glass wool and rock wool, mineral-bound and resin-bound building materials, such as plasterboards and cement boards or roofing tiles, and also combinations of these materials. Accordingly, the coating materials, adhesives and sealing compounds of the invention are also suitable for applications outside the automotive industry. Here they are particularly suitable for the coating, bonding and/or sealing of furniture, windows, doors, the interior and exterior of constructions, and for industrial coating, including coil coating, container coating, and the impregnation or coating of electrical engineering components. In the context of industrial coatings, they are suitable for the coating, bonding and/or sealing of virtually all parts for private or industrial use, such as radiators, domestic appliances, small metal parts such as nuts and bolts, hub caps, rims, packaging, or electrical components such as motor windings or transformer windings.

In the case of electrically conductive substrates it is possible to use primers which are prepared in a customary and known manner from electrodeposition coating materials. For this purpose both anodic and cathodic electrodeposition coating materials are suitable, but especially cathodic electrocoat materials.

The electrodeposition coating or electrodeposition coating film may be overcoated with a surfacer which is cured either alone or together with the electrodeposition coating film (wet-on-wet process). Overcoating with a surfacer is undertaken in particular in regions exposed to severe mechanical stress, such as by stone chipping, for example.

Examples of suitable cathodic electrodeposition coating materials and, where appropriate, of wet-on-wet processes are described in Japanese Patent Application 1975-142501 (Japanese laid-open specification JP 52-065534 A2, Chemical Abstracts No. 87: 137427) or in the patents and patent applications U.S. Pat. Nos. 4,375,498 A1, 4,537,926 A1, 4,761,212 A1, EP 0 529 335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 or WO 98/07794.

Similarly, appropriate surfacers, especially aqueous surfacers, which are also referred to as antistonechip primers or functional coats, are known from the patents and patent applications U.S. Pat. No. 4,537,926 A1, EP 0 529 335 A1, EP 0 595 186 A1, EP 0 639 660 A1, DE 44 38 504 A1, DE 43 37 961 A1, WO 89/10387, U.S. Pat. Nos. 4,450,200 A, 4,614,683 A1 or WO 94/26827.

It is also possible to coat, bond or seal primed or unprimed plastics parts made, for example, of ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviated codes in accordance with DIN 7728P1). In the case of unfunctionalized and/or apolar substrate surfaces, these may be subjected prior to coating in a known manner to a pretreatment, such as with a plasma or by flaming, or may be provided with a water-based primer.

In accordance with the invention, the clearcoats and solid-color topcoats of the invention are produced by applying the coating materials of appropriate composition, according to the invention, to the substrates described above, after which the resulting clearcoat and solid-color topcoat films are cured.

In accordance with the invention, the adhesive films and seals of the invention are produced by applying the adhesives and sealing compounds of the invention onto and/or into the substrates described above. In the case of the adhesive bonding of substrates, the surfaces of two or more substrates to be bonded are preferably coated with the adhesive of the invention, after which the surfaces in question are brought into contact, under pressure if appropriate, and the resulting adhesive films are cured.

In accordance with the invention, a multicoat color and/or effect coating system of the invention is produced on a primed or unprimed substrate by (1) applying a basecoat material to the substrate,
(2) drying and/or partially curing or fully curing the basecoat film,
(3) applying a clearcoat material to the dried and/or partially cured basecoat film or the cured basecoat, and
(4) curing the clearcoat film together with the basecoat film, or separately curing the clearcoat film.

In a first preferred variant, a conventional basecoat material and a clearcoat material of the invention are used.

In a second preferred variant, a conventional clearcoat material and a basecoat material of the invention are used.

In a third preferred variant, a basecoat material of the invention and a clearcoat material of the invention are used.

Examples of conventional basecoat materials are known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 or EP 0 817 684, column 5 lines 31 to 45.

Conventional clearcoat materials are one-component or multicomponent clearcoats, powder clearcoats, powder slurry clearcoats, UV-curable clearcoats or sealers, as known from the patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/10213, WO 94/22969 or WO 92/22615, U.S. Pat. Nos. 5,474,811 A1, 5,356,669 A1 or U.S. Pat. No. 5,605,965 A1, DE 42 22 194 A1, the product information bulletin from BASF Lacke+Farben AG, "Pulverlacke" [Powder coatings], 1990, the BASF Coatings AG brochure "Pulverlacke, Pulverlacke für industrielle Anwendungen" [Powder coating materials, powder coatings for industrial applications], January 2000, U.S. Pat. No. 4,268, 542 A1, DE 195 40 977 A1, DE 195 18 392 A1, DE 196 17 086 A1, DE-A-196 13 547, DE 196 52 813 A1, DE-A-198 14 471 A1, EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1, EP 0 002 866 A1, DE 197 09 467 A1, DE 42 03 278 A1, DE 33 16 593 A1, DE 38 36 370 A1, DE 24 36 186 A1, DE 20 03 579 B1, WO 97/46549, WO 99/14254, U.S. Pat. Nos. 5,824,373 A1, 4,675,234 A1, 4,634,602 A, 4,424,252 A, 4,208,313 A, 4,163,810 A, 4,129,488 A, 4,064, 161 A, 3,974,303 A, EP 0 844 286 A1, DE 43 03 570 A1, DE 34 07 087 A1, DE 40 11 045 A1, DE 40 25 215 A1, DE 38 28 098 A1, DE 40 20 316 A1 or DE 41 22 743 A1.

In general, the surfacer film, topcoat film, basecoat film and clearcoat film are applied in a wet film thickness such that curing thereof results in films having the thicknesses which are advantageous and necessary for their functions. In the case of the surfacer film this thickness is from 10 to 150, preferably from 15 to 120, with particular preference from 20 to 100, and in particular from 25 to 90 µm; in the case of the topcoat it is from 5 to 90, preferably from 10 to 80, with particular preference from 15 to 60, and in particular from 20 to 50 µm; in the case of the basecoat it is from 5 to 50, preferably from 6 to 40, with particular preference from 7 to 30, and in particular from 8 to 25 µm; and in the case of the clearcoats it is from 10 to 100, preferably from 15 to 80, with particular preference from 20 to 70, and in particular form 25 to 60 µm.

Curing may take place after a certain rest period. This period may have a duration of from 30 s to 2 h, preferably from 1 min to 1 h, and in particular from 1 min to 30 min. The rest period is used, for example, for the leveling and degassing of the applied films or for the evaporation of volatile constituents such as solvents or water. The rest period may be assisted and/or shortened by the application of elevated temperatures of up to 80° C., provided this does not entail any damage or change to the applied films, such as premature complete crosslinking, for instance.

In accordance with the invention, curing is carried out with actinic radiation, especially with UV radiation, and/or electron beams. If desired, it may be carried out with or supplemented by actinic radiation from other sources. In the case of electron beams it is preferred to operate under an inert gas atmosphere.

This may be ensured; for example, by supplying carbon dioxide and/or nitrogen directly to the surface of the applied films.

In the case of UV radiation curing as well it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 405 nm, or electron beam sources. Their arrangement is known in principle and may be adapted to the circumstances of the workpiece and the process parameters. In the case of workpieces of complex shape such as automobile bodies, those regions not accessible to direct radiation (shadow regions), such as cavities, folds and other structural undercuts, may be cured using point, small-area or all-round emitters, in conjunction with an automatic movement device for the irradiation of cavities or edges.

The equipment and conditions for these curing methods are described, for example, in R. Holmes, U. V. and E. B. Curing Formulations for Printing Inks, Coatings and Paints, SITA Technology, Academic Press, London, United Kingdom 1984.

Curing here may take place in stages, i.e., by multiple exposure to light or actinic radiation. It may also take place in alternation, i.e., by curing alternately with UV radiation and electron beams.

The thermal curing as well has no special features in terms of its method but instead takes place in accordance with the customary and known methods such as heating in a forced air oven or irradiation with IR lamps. As in the case of curing with actinic radiation, thermal curing as well may take place in stages. The thermal curing advantageously takes place at a temperature >90° C., preferably from 90 to 180° C., with particular preference from 110 to 160° C., and in particular from 120 to 150° C., for a time of from 1 min to 2 h, with particular preference from 2 min to 1 h, and in particular from 3 min to 30 min.

Thermal curing and curing with actinic radiation may be employed simultaneously or in alternation. Where the two curing methods are used in alternation, it is possible, for example, to commence with the thermal curing and end with the actinic radiation curing. In other cases it may prove advantageous to commence and to end with the actinic radiation curing. The skilled worker is able to determine the curing method which is most advantageous for the particular case in point, on the basis of his or her general knowledge in the art, with the assistance of simple preliminary tests if appropriate.

The coating materials, adhesives and sealing compounds of the invention have an extraordinarily high solids content with low viscosity and a long pot life.

The resulting coatings of the invention, especially the solid-color topcoats, clearcoats and multicoat color and/or effect coating systems, possess high hardness, flexibility and chemical resistance, excellent leveling, no runs, very good intercoat adhesion, an outstanding overall visual impression, very good weathering stability, very high scratch and abrasion resistance, and very good polishability.

The adhesive films of the invention are of high and long-term bond strength even under extreme and/or very sharply and rapidly changing climatic conditions.

The seals of the invention provide complete and long-term sealing against chemically aggressive substances.

Therefore, the primed and unprimed substrates of the invention that are coated with at least one coating of the invention, bonded with at least one adhesive film of the invention and/or sealed with at least one seal of the invention possess not only the advantages set out above but also a particularly long service life, which makes them particularly valuable from an economic standpoint.

EXAMPLES

Preparation Example 1

The Preparation of a Methacrylate Copolymer (A) for Use in Accordance with the Invention 650 parts by weight of an aromatic hydrocarbon fraction having a boiling range from 158 to 172° C. were charged to a laboratory reactor having a useful volume of 4 l and equipped with a stirrer, two dropping funnels for the monomer feed and the initiator feed, respectively, a nitrogen inlet pipe, thermometer, and reflux condenser. The solvent was heated to 140° C., after which at this temperature and with stirring a monomer mixture of 652 parts by weight of ethylhexyl acrylate, 383 parts by weight of hydroxyethyl methacrylate, 143 parts by weight of styrene, 213 parts by weight of 4-hydroxybutyl acrylate and 49 parts by weight of acrylic acid was metered in at a uniform rate over the course of four hours and an initiator solution comprising 113 parts by weight of tert-butyl perethylhexanoate and 113 parts by weight of the aromatic solvent was metered in at the uniform rate over the course of four and a half hours. The feedstreams were commenced simultaneously. After the end of the initiator feed, the reaction mixture was held at 140° C. for two hours and then cooled. The reaction mixture was diluted with a mixture of 1-methoxypropyl 2-acetate, butyl glycol acetate and butyl acetate. The resulting binder solution had a solids content of 65% by weight (1 h/130° C.).

Preparation Example 2

The Preparation of an Adduct (B)

N-(2-Hydroxyethyl)-2-isopropyl-1,3-oxazolidine was reacted with HDI in a molar ratio of 1:1 to give the adduct (B), as described on page 9 line 7 to page 17 line 6, "AV4—Monourethanes from HDI", of DE 196 09 617 A1.

Example 1

The Preparation of a Dual-cure Clearcoat Material of the Invention

The dual-cure clearcoat material of the invention was prepared by mixing 66.7 parts by weight of the binder solution of Preparation Example 1, 158.1 parts by weight of the adduct of Preparation Example 2, 1.33 parts by weight of hydroxyphenyltriazine (65 percent strength in xylene), 1.0 part by weight of N-amino ether 2,2,6,6-tetramethylpiperidinyl ester (Tinuvin® 292 from Ciba Specialty Chemicals), 0.5 part by weight of Lucirin® TPO (photoinitiator from BASF Aktiengesellschaft), 1.0 part by weight of Genocure® MBF (photoinitiator from Rahn), 2.0 parts by weight of Irgacure® 184 (photoinitiator from Ciba Specialty Chemicals), Byk® 307 (commercial additive from Byk Chemie), 29.4 parts by weight of butyl acetate and 52 parts by weight of an isocyanato acrylate based on hexamethylene diisocyanate (Roskydal® UA VPLS FWO 254 E from Bayer AG, 93.6 percent strength in butyl acetate). The clearcoat material was adjusted to an application viscosity of 32 seconds in the DIN 4 efflux cup by adding 10% butyl acetate.

The solids content of the clearcoat material of the invention was 82.0% by weight (1 g/1 h at 125° C. in a forced air oven; viscosity: 32 seconds in the DIN 4 efflux cup). The clearcoat material had a long pot life and was still processable after 8 h.

Example 2

The Production of a Multicoat Coating System of the Invention

To produce the multicoat coating system, steel test panels coated with an electrodeposition coating with a dry film thickness of from 18 to 22 μm were coated with an aqueous surfacer. The resultant aqueous surfacer film was baked at 160° C. for 20 minutes to give a surfacer coating having a dry film thickness of from 35 to 40 μm. The surfacer coating was subsequently coated with a black aqueous basecoat material in a film thickness of from 12 to 15 μm, and the resultant aqueous basecoat film was flashed off at 80° C. for 10 minutes. Subsequently, the clearcoat material of Example 1 was applied pneumatically using a gravity-feed spraygun in one cross pass in a film thickness of from 40 to 45 μm. Thereafter, the clearcoat film was flashed off at room temperature for 2 minutes and at 80° C. for 10 minutes. The flashed-off clearcoat film was cured initially with UV radiation (dose: 1500 mJ/cm$^2$ belt speed 4 m/min). Subsequently, the aqueous basecoat film and the clearcoat film were cured thermally in a forced air oven at 140° C. for 20 minutes.

The multicoat system of the invention had a gloss to DIN 67530 of 84.1 and a micropenetration hardness of 124.1 N/mm$^2$ (universal hardness of 26.6 mN, Fischerscope 100 V with diamond pyramid in accordance with Vickers).

The scratch resistance of the multicoat system was determined by the sand test. For this purpose, the film surface was loaded with sand (20 g of quartz silver sand, 1.5–2.0 mm). The sand was placed in a beaker (with its base cut off level) which was attached firmly to the test panel. The panel, with the beaker and sand, was set in shaking movements by means of a motor drive. The movement of the loose sand caused damage to the film surface (100 double strokes in 20 s). Following sand exposure, the test area was cleaned of abraded material, wiped off carefully under a jet of cold water, and then dried with compressed air. The gloss was measured to DIN 67530 before and after damage (measurement direction perpendicular to the direction of scratching):

| | |
|---|---|
| initial: | 84.1 |
| after damage: | 82.3 |
| 2 h at 60° C.: | 84.1 |

In addition, the scratch resistance was determined by the brush test as well. For this test, the test panels bearing the multicoat system were stored at room temperature for at least two weeks, before the test was carried out.

The scratch resistance was assessed with the aid of the BASF brush test as described in FIG. 2 on page 28 of the article by P. Betz and A. Bartelt, Progress in Organic Coatings, 22 (1993), pages 27–37, albeit with modification as to the weight used (2000 g instead of the 280 g specified therein), as follows:

In the test, the paint surface was damaged using a mesh fabric loaded with a mass. The mesh fabric and the paint surface were wetted copiously with a detergent solution. The test panels were moved back and forth under the mesh fabric in reciprocal movements by means of a motor drive.

The test specimen was an eraser (4.5×2.0 cm, broad face perpendicular to the direction of scratching) over which a nylon mesh fabric (No. 11, 31 μm mesh size, Tg 50° C.) was stretched. The superimposed weight was 2000 g.

Prior to each test, the mesh fabric was replaced, with the, running direction of the fabric meshes parallel to the direction of scratching. Using a pipette, about 1 ml of a freshly agitated 0.25% strength Persil solution was applied in front of the eraser. The rotary speed of the motor was adjusted so that 80 double strokes were performed within a time of 80 s. After the test, the remaining washing liquid was rinsed off with cold tap water and the test panels were blown dry with compressed air. Measurements were made of the gloss to DIN 67530 before and after damage (measurement direction perpendicular to the direction of scratching):

| | |
|---|---|
| initial: | 84.1 |
| after damage: | 72.1 |
| 2 h at 60° C.: | 80.9 |

The results demonstrate the excellent scratch resistance and the outstanding reflow behavior of the multicoat system of the invention and, respectively, of the clearcoat.

The acid resistance was determined by the BART method.

The BART (BASF ACID RESISTANCE TEST) was used to determine the resistance of film surfaces to acids, alkalis and water droplets. The multicoat system was subjected to further temperature loads after baking, in a gradient oven (30 min at 40° C., 50° C., 60° C. and 70° C.) Beforehand, the test substances (1%, 10% and 36% strength sulfuric acid; 5% strength sulfurous acid; 10% strength hydrochloric acid; 5% strength sodium hydroxide solution; DI (deionized) water—1,2,3 and 4 drops respectively) are applied in a defined manner using a metering pipette. After the substances have been allowed to act, they are removed under running water and the damage is assessed visually after 24 h in accordance with a predetermined scale:

| Rating | Appearance |
| --- | --- |
| 0 | no defect |
| 1 | slight marking |
| 2 | marking/dulling/no softening |
| 3 | marking/dulling/color change/softening |
| 4 | cracks/incipient etching |
| 5 | clearcoat removed |

Each individual marking (spot) was evaluated. The result was determined in each case as a sum of ratings for one temperature: 40° C.: 1.5; 50° C.: 3.5; 60° C.: 6.0; 70° C.: 12.5.

The BART underscores the high acid stability of the multicoat coating system of the invention and, respectively, of the clearcoat of the invention.

What is claimed is:

1. A multicomponent coating material composition, adhesive composition, or sealing compound composition comprising:
   (A) at least one binder containing on average at least one isocyanate-reactive functional group;
   (B) at least one adduct comprising a reaction product of
      (b1) at least one diisocyanate and
      (b2) at least one compound of the general formula I containing an isocyanate-reactive functional group:

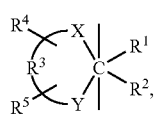

in which the variables have the following definition:
   $R^1$ and $R^2$ independently of one another are hydrogen atoms or alkyl radicals having 1 to 10 carbon atoms;
   X and Y independently of one another are an oxygen atom, a sulfur atom or a radical $>=N-R^6$, in which $R^6$ is an aliphatic radical having 1 to 30 carbon atoms and whose carbon chain may be interrupted by one or more oxygen atoms, or are an aromatic group having 6 to 30 carbon atoms;
   $R^3$ is an alkylene radical having 1 to 5 carbon atoms;
   $R^4$ and $R^5$ independently of one another are hydrogen atoms, isocyanate-reactive functional groups, or radicals $R^6$;

with the proviso that one radical $R^4$, $R^5$ or $R^6$ contains an isocyanate-reactive functional group or one radical $R^4$ or $R^5$ is an isocyanate-reactive functional group, in which case the other radicals $R^4$, $R^5$ or $R^6$ where present—contain no isocyante-reactive functional groups; the molar ratio of isocyanate groups in the diisocyanates (b1) to the isocyanate-reactive functional groups in the compound I being from 0.8:1.2 to 1.2:0.8;
   and
   (C) at least one crosslinking agent containing on average at least one isocyanate group and at least one functional group having at least one bond which may be activated by actinic radiation in the molecule.

2. The multicomponent composition of claim 1, wherein the compounds of the general formula I are one of
   a dioxolane of the general formula II:

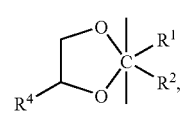

a dioxane of the general formula III:

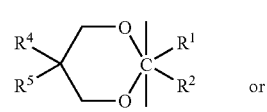

or an oxazolidine of the general formula IV:

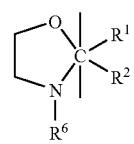

in which the radicals $R^1$, $R^2$, $R^4$, $R^5$ and $R^6$ are as defined in claim 1, and the radicals $R^4$ or $R^6$ contain isocyanate-reactive functional group.

3. The multicomponent composition of claim 1, wherein the isocyanate-reactive functional groups used are at least one of a hydroxyl group, a thiol group, a primary amino group, and secondary amino group.

4. The multicomponent composition of claim 1, wherein the binder contains on average at least one functional group having at least one bond which may be activated with actinic radiation in the molecule.

5. The multicomponent composition of claim 1, wherein the bonds which may be activated with actinic radiation comprise at least one of a carbon-hydrogen single bond, a carbon-carbon single bond, a carbon-oxygen single bond, a carbon-nitrogen single bond, a carbon-phosphorus single bond, a carbon-silicon single bond, a carbon-carbon double bond, a carbon-oxygen double bond, a carbon-nitrogen double bond, a carbon-phosphorous double bond, and a carbon-silicon double bond.

6. The multicomponent composition of claim 1, wherein the bonds that may be activated with actinic radiation comprise carbon-carbon double bonds.

7. The multicomponent composition of claim 6, wherein the double bonds that may be activated with actinic radiation are present in at least one of a (meth)acrylate group, an ethacrylate group, a crotonate group, a cinnamate group, a vinyl ether group, a vinyl ester group, a dicyclopentadienyl group, a norbornenyl group, an isoprenyl group, an isopropenyl group, an allyl group, a butenyl group, a dicyclopentadienyl ether group, a norbornenyl ether group, an isoprenyl ether group, an isopropenyl ether group, an allyl ether group, a butenyl ether group, a dicyclopentadienyl ester group, a norbornenyl ester group, an isoprenyl ester group, an isopropenyl ester group, an allyl ester group, and a butenyl ester groups.

8. The multicomponent composition of claim 1, wherein the crosslinking agent is prepared by reacting a polyisocyanate having a functionality of at least 2.0 with at least one compound containing at least one isocyanate-reactive functional group and at least one bond which may be activated with actinic radiation.

9. The multicomponent composition of claim 1, wherein the polyisocyanate contains at least one of an isocyanurate group, a biuret group, an allophanate group, an aminooxo-diazinedione group, a urethane group, a urea group, a carbodiimide group, and a uretdione groups.

10. The multicomponent composition of claim 9, wherein the polyisocyanate contains at least one of an allophanate group and an isocyanurate group, and wherein the polyisocyanate is prepared from hexamethylene diisocyanate.

11. The multicomponent composition of claim 1, further comprising at least one color and/or effect pigment.

12. A process for producing a color and/or effect coating comprising applying a solid-color topcoat comprising the multicomponent composition of claim 11 to a primed or unprimed substrate.

13. A process for producing a clearcoat comprising applying a clearcoat material comprising the multicomponent composition of claim 1 to one of a primed substrate, an unprimed substrate, and a coated substrate.

14. A process for producing a multicoat color and/or effect coating system on a substrate comprising
  (1) applying a basecoat material to the substrate to form a basecoat film,
  (2) at least one of drying and at least partially curing the basecoat film,
  (3) applying a clearcoat material to the at least one of dried and at least partially cured basecoat film, and
  (4) one of i) curing the clearcoat film together with the basecoat film if the basecoat film is not fully cured, or ii) separately curing the clearcoat film if the basecoat film is fully cured,
wherein one of
  (a) the clearcoat material comprises the multicomponent composition of claim 1,
  (b) the basecoat material comprises the multicomponent composition of claim 1, and which further comprises at least one color and/or effect pigment, or
  (c) the basecoat material comprises the multicomponent composition of claim 1 and which further comprises at least one color and/or effect pigment, and the clearcoat material comprises the multicomponent composition of claim 1.

15. A process comprising applying the multicomponent composition of claim 1 to at least one of onto and into a substrate, and forming one of an adhesive film and seal.

16. The process of claim 12, wherein the substrate comprises one of a motor vehicle body, a part of a motor vehicle body, an interior construction of a motor vehicle, an exterior construction of a motor vehicle, a door, a window, furniture, an industrial component, a coil, a container, and an electrical components.

17. The process of claim 13, wherein the substrate comprises one of a motor vehicle body, a part of a motor vehicle body, an interior construction of a motor vehicle, an exterior construction of a motor vehicle, a door, a window, furniture, an industrial component, a coil, a container, and an electrical component.

18. The process of claim 14, wherein the substrate comprises one of a motor vehicle body, a part of a motor vehicle body, an interior construction of a motor vehicle, an exterior construction of a motor vehicle, a door, a window, furniture, an industrial component, a coil, a container, and an electrical component.

19. The process of claim 15, wherein the substrate comprises one of a motor vehicle body, a part of a motor vehicle body, an interior construction of a motor vehicle, an exterior construction of a motor vehicle, a door, a window, furniture, an industrial component, a coil, a container, and an electrical component.

* * * * *